US011205152B1

(12) United States Patent
Singh

(10) Patent No.: US 11,205,152 B1
(45) Date of Patent: Dec. 21, 2021

(54) VIRTUAL LOGISTICAL NETWORK OVERLAY FOR PHYSICAL LOGISTICAL NETWORK

(71) Applicant: Amazon Technologies, Inc., Seattle, WA (US)

(72) Inventor: Deshanand Pratap Singh, Toronto (CA)

(73) Assignee: Amazon Technologies, Inc., Seattle, WA (US)

(*) Notice: Subject to any disclaimer, the term of this patent is extended or adjusted under 35 U.S.C. 154(b) by 1101 days.

(21) Appl. No.: 15/074,254

(22) Filed: Mar. 18, 2016

(51) Int. Cl.
*G06Q 10/08* (2012.01)

(52) U.S. Cl.
CPC .................... *G06Q 10/083* (2013.01)

(58) Field of Classification Search
CPC .... G06F 12/023; G06F 3/0607; G06F 3/0608; G06F 3/0644; G06F 3/0647
USPC ........ 710/19; 711/162, 170, 103; 340/10.51, 340/10.1; 235/492; 705/7.11, 7.12, 7.26, 705/330, 332
See application file for complete search history.

(56) References Cited

U.S. PATENT DOCUMENTS

| | | | | |
|---|---|---|---|---|
| 6,574,742 B1* | 6/2003 | Jamroga | ............... | G06F 19/321 713/400 |
| 7,707,288 B2* | 4/2010 | Dawson | .................. | G06F 9/505 709/226 |
| 2014/0058776 A1* | 2/2014 | Aoyama | ............ | G06Q 30/0201 705/7.13 |
| 2016/0042315 A1* | 2/2016 | Field-Darragh | ... | G06Q 30/0282 705/28 |
| 2016/0210465 A1* | 7/2016 | Craske | ................ | G06F 9/30043 |
| 2017/0005869 A1* | 1/2017 | Prasad | ................ | H04L 41/0893 |
| 2018/0176729 A1* | 6/2018 | Mycek | .................. | H04W 4/027 |
| 2019/0023180 A1* | 1/2019 | Manci | ..................... | B60Q 9/00 |

* cited by examiner

*Primary Examiner* — Akiba K Robinson
(74) *Attorney, Agent, or Firm* — Lee & Hayes, P.C.

(57) ABSTRACT

Systems and methods to warehouse, handle, and deliver products are disclosed. The system can comprise a vendor-based virtual network that is associated with a supplier-based physical network. The system can enable vendors with institutional, market, or industry knowledge to manage inventory, logistics, and delivery more efficiently. The system can enable vendors to configure a virtual warehouse and delivery network based on the institutional, market, or industry knowledge. The virtual network can be mapped—behind the scenes—to physical warehouses and delivery networks by warehousing providers ("providers") based at least in part on the virtual network. The provider can then adjust the physical network based on market knowledge, research, physical sales, warehouse and personnel availability, weather, and other factors. The provider can also offer periodic data to the vendor based on physical sales and delivery information to enable both the virtual and physical networks to converge on an efficient solution.

20 Claims, 10 Drawing Sheets

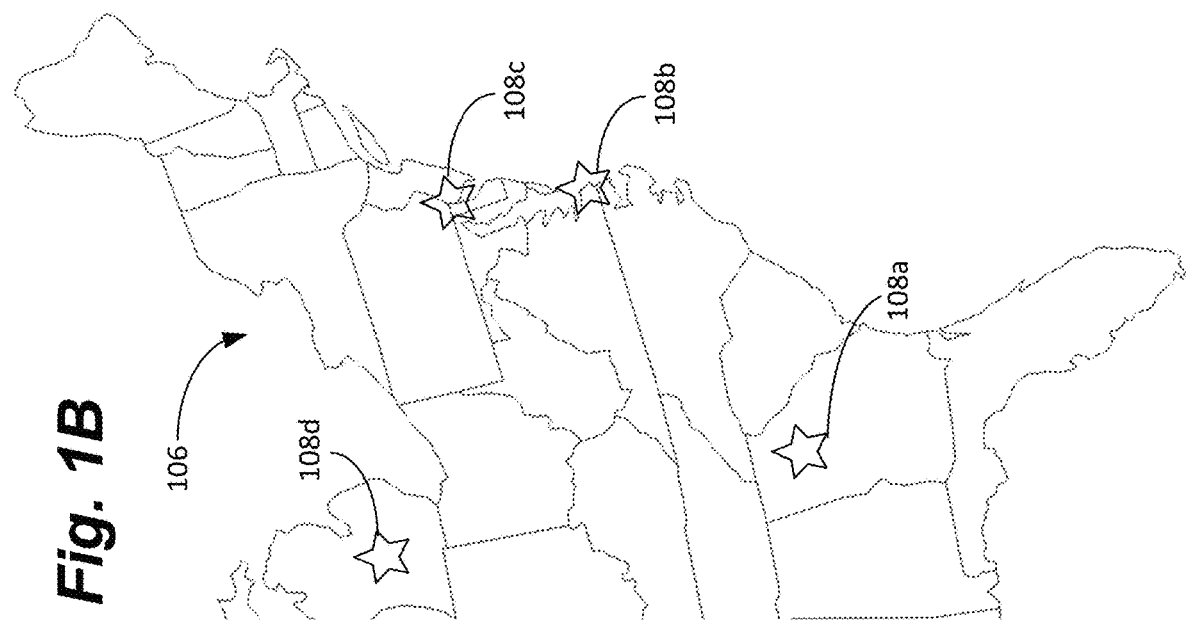
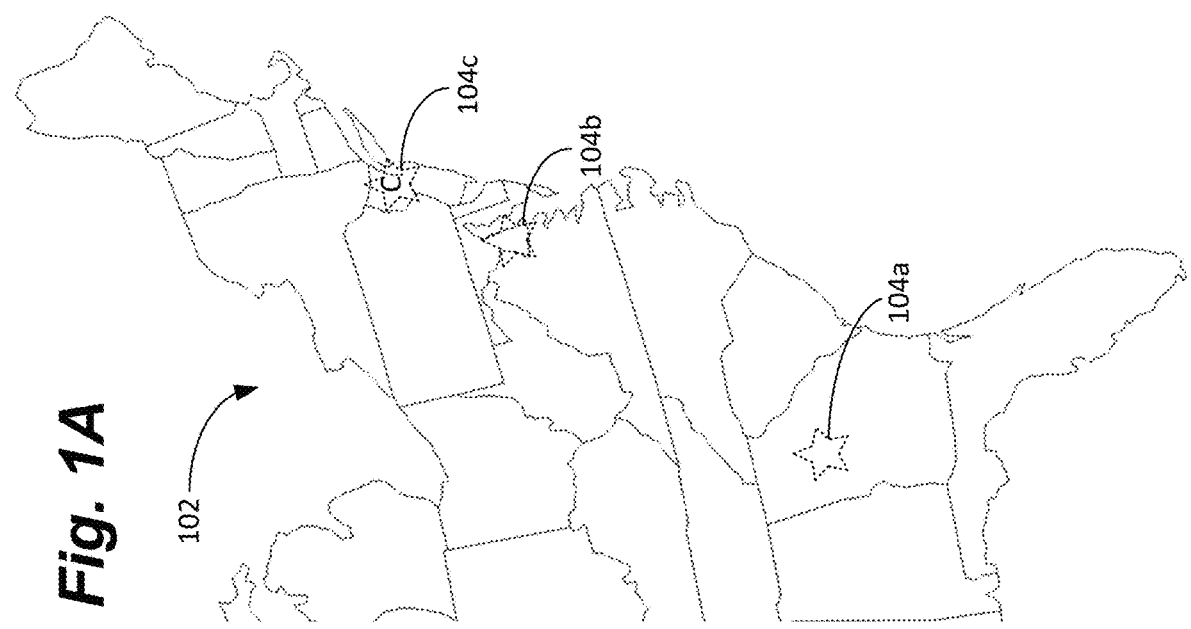

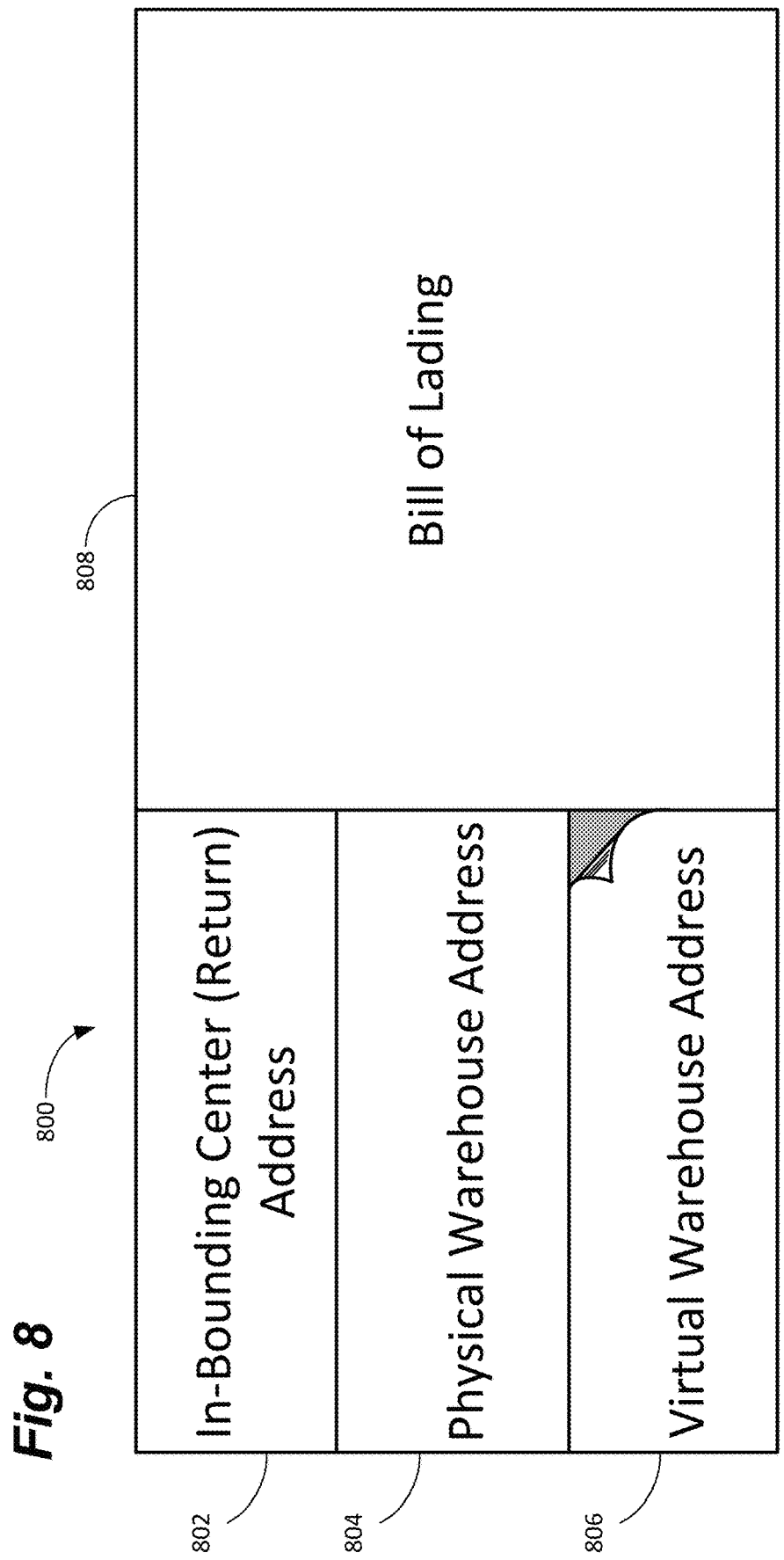

VIRTUAL LOGISTICAL NETWORK OVERLAY FOR PHYSICAL LOGISTICAL NETWORK

BACKGROUND

A number of providers exist that provide storage and delivery services to vendors. These providers offer a number of different services to enable vendors to store and deliver products to consumers with varying degrees of involvement on the vendor's part. In some cases, the vendor may simply send one or more products to the provider at a central location. The provider can then store the product in one or more locations, for example, and offer the product on a central website. The provider may also offer goods for sale on a vendor specific website hosted by the provider.

In other cases, the vendor may be more involved to varying degrees. The vendor may host their own website, for example, and/or handle their own sales. In this case, the provider may simply provide storage and delivery services.

The cost to provide these services can be based on the relative amounts of involvement of the vendor and the provider. In other words, in some scenarios, a vendor may simply hand over products to a provider and ask that the provider handle the remainder of the process (e.g., advertising, storage, sales, and delivery). In this "full service" scenario, the provider may charge a higher fee for providing the additional services. A vendor that hosts its own website and handles sales, on the other hand, may only rely on the provider for storage and/or delivery services. This vendor may receive a lower rate for the reduced services provided.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A depicts a virtual network map created by a vendor of one or more products denoted by virtual warehouse icons, in accordance with some examples of the present disclosure.

FIG. 1B depicts a physical network map of a provider of one or more of logistics, warehousing, and shipping services denoted by physical warehouse icons, in accordance with some examples of the present disclosure.

FIG. 8 depicts a modifiable shipping label, in accordance with some examples of the present disclosure.

DETAILED DESCRIPTION

Figure 2A:
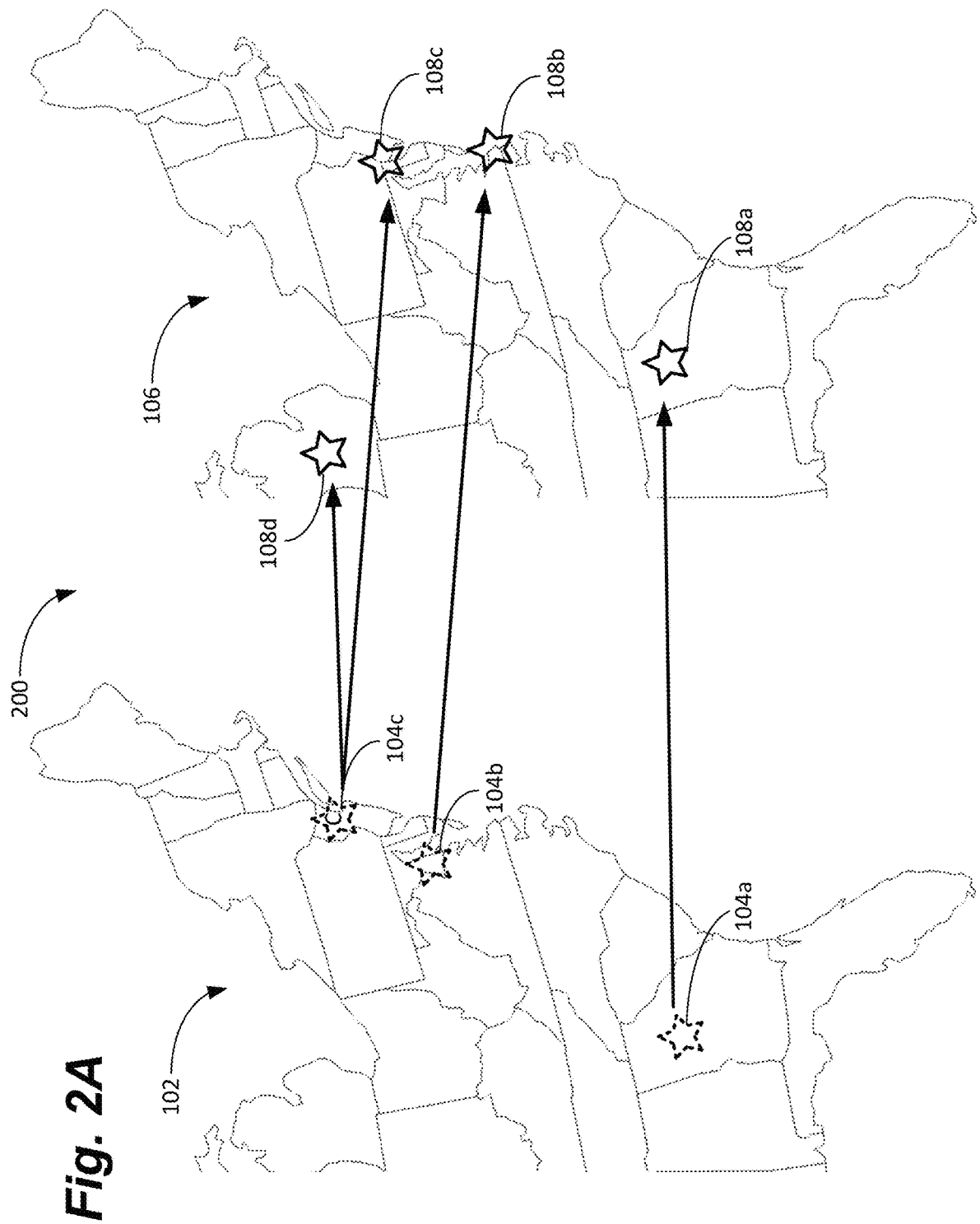
FIG. 2A depicts a mapping of the virtual network of FIG. 1A to the physical network of FIG. 1B, in accordance with some examples of the present disclosure.

A number of providers exist that supply retail and wholesale sales, storage, and delivery of goods to vendors. These providers offer a number of services including, but not limited to, storing, billing, website support, and delivery. In some cases, the extent of vendor involvement may be limited to the vendor simply sending one or more products to the provider at a central location. The provider can then transfer the products to one or more storage locations, for example, and offer the product on a central website, for example, or on the vendor's website. In this scenario, the provider can handle sales and delivery of the product "behind the scenes" for a fee, for example, a percentage of sales, or other form of compensation. This type of full service provider may be appealing to small vendors, for example, with limited resources and/or market knowledge or to vendors that are simply risk averse.

In the "full-service" scenario, however, the provider is responsible for a greater portion of the sales cycle. As a result, the provider is exposed to higher risk and higher cost based on the warehouse locations chosen, physical sales, and delivery fees, among other things. In some cases, for example, the provider may predict that the product will sell predominantly on the East Coast and, as a result, may stock a majority of the product in East Coast warehouses. If the product then sells more than expected in the Pacific Northwest, for example, the provider is responsible for the additional cost to either 1) deliver the product over longer distances or 2) move the product to a more suitably located warehouse and then deliver the product. To cover the cost of the providing these services and assuming the associated risk, therefore, providers may charge a higher rate for full-service logistics than for other levels of service.

Some vendors, therefore, may want to assume a greater role in the logistics process in exchange for lower provider fees. In some cases, these vendors may be established businesses with known sales patterns and/or other institutional knowledge that enables the vendor to predict more accurately where their products will sell. In other cases, these vendors may simply be entrepreneurs, for example, with a higher threshold for risk or limited funds for logistics and shipping.

To this end, examples of the present disclosure can comprise a system for providing a virtual warehouse and delivery network associated with a particular vendor. The system can enable vendors to configure virtual logistics networks based on, for example, the vendor's market or intuitional knowledge. Providers can then overlay this virtual network with a physical logistics network based on, for example, proximity to virtual network component locations, warehouse and personnel availability, and weather. As used herein, the term "logistics network" refers to the entire potential supply chain including physical components, such as warehouse, sorters, workers, etc.; transportation components such as delivery trucks, shipping routes, and delivery methods (e.g., ground and air package delivery); and logistics software and hardware including warehouse management software, package delivery and shipping software, and the attendant computers and computer networks.

In some examples, the systems and methods described herein can essentially decouple a virtual logistics network from a physical logistics network. In other words, a vendor can design his "ideal" shipping network, regardless of the locations of physical components and facilities in the physical logistics network. In this manner, providers can make adjustments to the physical network that have no effect on the vendor or the virtual network. This can enable providers to adjust to various market forces (e.g., weather, labor, or transportation issues) in an efficient manner. In some examples, with shared market research, the virtual and physical networks can converge on the same efficient solution, yet the physical network can remain agile in light of short-term market forces, for example.

The system can include a virtual logistics network configured by the vendor based on his knowledge of the market for his products. The provider can design a similar physical logistics network based on the locations of physical assets and the provider's market knowledge. The virtual network can then be mapped to the physical network to enable fulfillment of orders from the vendor's customers. When necessary, the mapping can be changed behind the scenes, possibly at the provider's discretion, to enable the provider to react to changing market forces. Service charges to the vendor can be based on the performance of the virtual network, while physical cost to the provider can be associated with the physical network.

As shown in FIG. 1A, Vendor A can be an established vendor, for example, with an established product. Vendor A may nonetheless wish to enter a different market segment for the first time such as online sales, for example, or simply may not have the resources or desire to handle storage and delivery for the product. Because Vendor A may nonetheless have market knowledge, however, Vendor A may wish to handle some of the logistics associated with warehousing and delivery of the product in exchange for a reduced handling fee from the provider.

The provider can offer a reduced fee in exchange for reduced risk to the provider. In addition, as discussed below, depending on the vendor's ability to predict the market, the system can also represent an income stream for the provider. In other words, the provider can charge the vendor agreed upon rates for warehousing and shipping, for example, based on the virtual network designed by the vendor. In reality, however, the provider pays costs based on the physical network designed by the provider. Thus, if the physical network outperforms the virtual network, then the difference between the fees paid by the vendor and the actual costs to the provider can represent an additional revenue stream.

As shown in FIG. 1A, using a system, Vendor A can configure a virtual warehouse and delivery network, or virtual network 102, based on his experience, research, or even best guess. Based on prior sales, Vendor A may know, for example, that a majority of past sales were made on the East Coast, with particularly strong sales in Atlanta, Ga.; New York City, N.Y.; and Washington, D.C. In addition, as major transportation hubs, these locations may also provide a good distribution of warehouses centrally located for sales along the remainder of the East Coast. As a UPS' hub, for example, Atlanta may provide lower shipping rates than other cities, even when shipping over longer distances. Thus, the virtual network 102 can comprise a virtual warehouse 104 in Atlanta 104a, Washington 104b, and New York City 104c.

In contrast, as shown in FIG. 1B, the provider may choose a physical warehouse and delivery network, or physical network 106, based on the locations of actual, or physical, warehouses 108 owned and/or operated by the provider relative to the components in the virtual network 102. The provider may actually have a physical warehouse 108 in Marietta, Ga. 108a, Virginia Beach, Va. 108b, and Philadelphia, Pa. 108c, for example. The provider may choose the physical warehouses 108, for example, based in part, or wholly, on their proximity to the virtual warehouses 104 chosen by the vendor. As discussed below, however, the physical warehouses 108 can also be chosen for a variety of other reasons including, but not limited to, their proximity to major shipping or transportation hubs, local real estate costs, and the availability and cost of high quality labor.

In addition, in anticipation that the vendor may receive at least some orders from areas of the country other than the East Coast, the provider may also choose a physical warehouse 108 based on a location not specified by the vendor, such as in Lansing, Mich. 108d. The provider may make this assumption based on superior in-house knowledge of the market at large. In other words, the provider may represent a number of vendors in the same, or similar, fields, for example, or simply may have information that provides a better picture of the larger market.

Thus, based on sales from other vendors that are both customers of the provider and offer a similar product line, the provider may choose physical warehouses 108 in locations other than those related to the virtual network 102. In the case of the Lansing warehouse 108d, however, the provider is assuming the risk that there will be at least some sales from more western locales enabling the provider to ship those orders at a lower rate than is indicated by the virtual network 102 configuration. In other words, because the vendor did not choose to put a virtual warehouse 104 anywhere except on the East Coast, the vendor is not responsible for additional shipping costs, for example, incurred due to the configuration by the provider of the physical network 106. Thus, in this case, if all orders actually do come from the East Coast, the provider may incur additional costs related to the Lansing warehouse 108d.

Figure 2B:
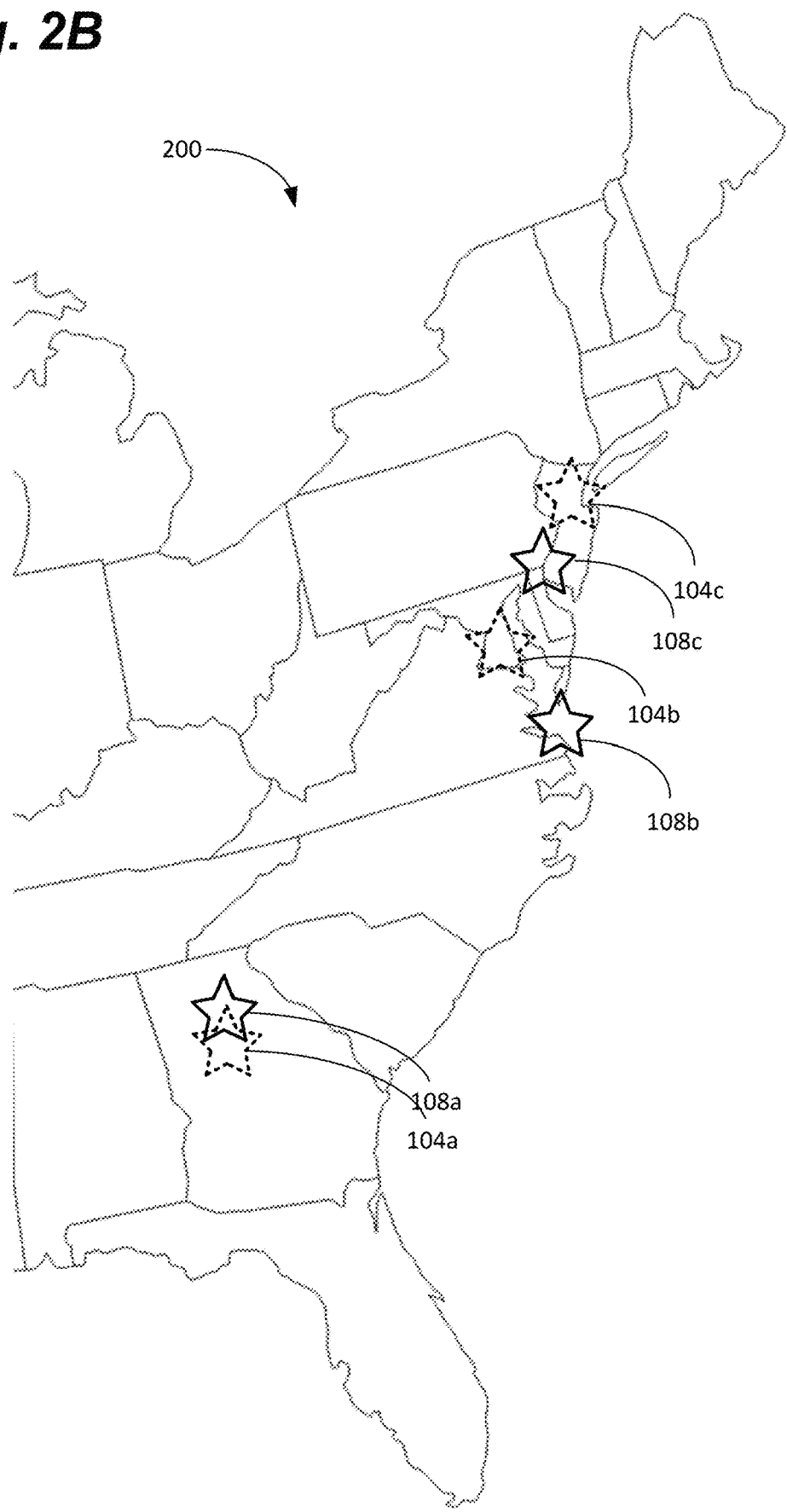
FIG. 2B depicts an overlay of the virtual network of FIG. 1A to the physical network of FIG. 1B, in accordance with some examples of the present disclosure.

As shown in FIGS. 2A and 2B, after configuration of both networks 102, 106, the system can then create a virtual-to-physical map 200. In other words, the virtual network 102 can be mapped to (FIG. 2A), or overlaid on (FIG. 2B), the physical network 106 to form the virtual-to-physical map 200. In this manner, when the vendor receives an order and chooses a virtual warehouse 104 to fulfill the order, for example, the virtual warehouse 104 can be mapped to the physical warehouse 108 used to fulfill the order.

As discussed above, this represents an opportunity for the provider to make or lose money. In other words, if the provider has configured a physical warehouse 108 that is closer to the destination for the order, then the provider may have lower costs (e.g., for shipping and labor) when compared to the costs based on the location of the virtual warehouse 104. This difference between the actual costs and the rate charged to the provider based on his configuration of the virtual network 102 represents a potential revenue stream. Of course, the opposite can be true, and the provider may be forced to absorb costs associated with physical network 106 configurations that are less efficient than the associated virtual network 102.

Similarly, the provider may provide the vendor with a central location to send product for in-bounding—i.e., shipping his products to the provider for distribution. When shipping product to the provider, however, the vendor may provide two addresses. The first address designating a central receiving and processing center, or in-bounding center, proximate the vendor and configured for in-bounding and the second address designating a virtual address for the virtual warehouse 104 the vendor has chosen for the product. The addresses can comprise actual street addresses or other designations such as, for example, warehouse numbers, internal address codes, bar codes, or other means to identify the virtual and/or physical addresses associated with the product. Regardless of form, the virtual address can then be mapped to one or more physical warehouses 108 for warehousing and distribution by the provider.

As an added benefit, the vendor need not be provided with the addresses for the physical warehouses 108. Indeed, from the vendor's perspective, the actual address of the physical warehouse 108 may be irrelevant. The vendor simply wants his orders taken, and products delivered, in an efficient manner. This can also provide additional security and privacy for the physical warehouses 108 possibly preventing theft, confrontation, or other undesirable outcomes.

Example 1

Thus, if the vendor has a history of multiple orders from New York City, the vendor may designate a virtual warehouse 104 in New York City 104c. Upon receiving an order from New York City, the vendor will naturally select the New York City virtual warehouse 104c to fulfill the order. Regardless of where the physical warehouse 108 actually is, therefore, the vendor will be charged for shipping, and other charges, as if he was shipping from the New York City virtual warehouse 104c. This can include the material and labor cost to package the product for shipping, taxes, shipping costs, etc.

Because the provider has not designated a physical warehouse 108 in New York City, however, the provider will likely be shipping the product from the Philadelphia physical warehouse 108c. As a result, the provider may pay slightly higher shipping costs, for example, to ship the product over a slightly longer distance. In this case, therefore, the vendor has accurately predicted demand and may derive a cost benefit for his knowledge.

It may appear on the face that the provider has chosen poorly in this situation. And, while the provider is forced to ship the product over a longer distance (from Philadelphia instead of directly from New York City), the provider may derive savings in other ways. The labor rates and/or taxes in Philadelphia may be lower than in New York City, for example, which may partially, or fully, offset the cost of shipping. In addition, Philadelphia may be a hub for the shipping company, resulting in lower shipping rates despite the increased distance.

Because the provider can choose any physical warehouse 108 that contains the vendor's product, therefore, choosing the physical warehouse 108 from which to ship is divorced from the location of virtual warehouses 104 and can be based solely on (1) the total cost to fulfill an order and (2) meeting the vendor's delivery requirements (e.g., delivery within five days). Thus, the provider may choose to ship from the physical warehouse 108 that is closest to the virtual warehouse 104, closest to the order destination, or that has the lowest shipping and/or labor costs. Indeed, the system provides sufficient flexibility that two orders from the same area at two different times can be shipped from two different physical warehouses 108 based on changing market forces. Thus, differences between the virtual network 102 and the physical network 106 can represent revenue or loss for the provider, depending on the situation.

Example 2

If, on the other hand, the vendor receives an order from Portland, Oreg., the vendor can only select one of the East Coast virtual warehouses 104 because he has not chosen any virtual warehouses 104 in more western locations. As a result, the vendor may choose the East Coast virtual warehouse 104 with the lowest shipping cost to Portland. The vendor may select Atlanta, for example, because Atlanta is a UPS® hub.

The provider, on the other hand, can choose either the Philadelphia 108c or the Lansing physical warehouse 108d. In other words, because the provider has chosen at least one more western physical warehouse 108 behind the scenes (i.e., the Lansing warehouse 108d), the provider can now choose the Lansing warehouse 108d to ship the order to Portland. In this scenario, as agreed, the vendor pays shipping charges as though he was shipping from Atlanta to Portland. The provider, however, need only ship from Lansing to Portland.

As shown, the provider can map more than one virtual warehouse 104 to a single physical warehouse 108, or vice-versa. Thus, the provider can divide inventory between multiple physical warehouses 108, for example, in an effort to better predict demand. In this case, the provider may split the inventory between the Lansing warehouse 108d (to cover western orders) and the Philadelphia warehouse 108c (to fulfill northeastern orders).

This savings in shipping cost represents a potential revenue stream for the provider. In addition, labor, taxes, and other costs may be lower in Lansing compared to major cities on the East Coast. In this case, the provider has more accurately predicted demand and may derive a revenue benefit for his knowledge. In other words, the vendor is paying for shipping and handling from the Atlanta virtual warehouse 104a, for example, while the provider is paying for shipping and handling from the Lansing physical warehouse 108d. The difference in these costs represents a profit (or loss).

In some cases, the provider may supply periodic updates to the vendor based on, for example, physical sales, warehouse capacities, and/or transportation costs. If the vendor has an unexpected number of sales to the West Coast, for example, the provider may provide monthly or quarterly sales reports to the vendor to enable the vendor to modify the virtual network 102. In this manner, the virtual network 102 and the physical network 106 can converge on an efficient solution for the vendor's warehousing and shipping needs.

With this in mind, the provider may be able to offer additional discounts to vendors who have used the system for a predetermined amount of time because the system has been substantially optimized by both parties. In other words, as the two networks 102, 106 converge on similar solutions, the likelihood that the cost to ship from a virtual warehouse 104 will differ significantly from the cost to ship from a physical warehouse 108 is reduced. Thus, while the revenue potential for the provider resulting from these differences is reduced, so is the risk of incurring additional costs.

Significantly, the system can also be used to enable the provider to adjust for a variety of market forces without disturbing the vendor. In other words, the system provides the agility necessary to compensate for changing market forces. Because the provider can reconfigure the physical network 106 without consent from (or even knowledge of) the vendor, the provider is better able to cope with changing market forces. Of course, in some cases, the provider may nonetheless inform the vendor of changes to the physical network 106. In other cases, the vendor may require that the provider seek approval from the vendor prior to making physical changes. In this manner, if the vendor has some inside market information, the vendor can choose not to make the changes to the mapping between the virtual network and the physical network (at his risk).

With regard to market forces, the efficiency of a warehouse generally begins to decline, for example, as the warehouse nears its total capacity. The total capacity can relate to the total throughput for the warehouse based on inventory storage capacity, packaging capacity, and shipping capacity. In other words, if any, or a combination, of these components are nearing their limits, they can act as a bottleneck to the throughput of the warehouse. Thus, if a physical warehouse nears a predetermined percentage of its total capacity (e.g., 90%), efficiency may suffer, and it may be desirable to move inventory from a first physical warehouse 108 that is near capacity to a less busy second physical warehouse 108 (e.g., a physical warehouse operating below 80% of its total capacity) to improve efficiency. In this case, the relevant virtual warehouses 104 can simply be unilaterally remapped from the first physical warehouse 108 to the second physical warehouse 108 within the physical network 106. The provider can then move the necessary inventory from the first physical warehouse 108 to the second physical warehouse 108 at the provider's expense. Of course, this expense may be offset by lower labor costs—by eliminating overtime at the first warehouse 108, for example, or simply because labor is cheaper in one location than the other. In the case of a very busy warehouse, for example, the additional labor cost may come in the form of overtime.

The cost of the move from the first warehouse 108 to the second warehouse 108 may also be offset by lower shipping rates. Assume, for example, that the provider has agreed to deliver product to consumers within five days. Because the first warehouse 108 is overtaxed, however, it takes three days for the product to be pulled and packaged for shipment. To meet the five-day deadline, therefore, the provider is now forced to ship the product to the consumer using two-day delivery. If, on the other hand, the second warehouse 108 can pull and package the product same-day, the provider may be able to use standard ground shipping and still meet the five-day deadline. This can result in significant savings per package, which can offset the cost of moving inventory from the first warehouse 108 to the second warehouse 108 and other associated costs. Similarly, shipping companies may offer special shipping rates from certain locations to shift traffic away from other parts of their network (for many of the same reasons discussed herein). Additionally, shipping costs may also be offset by lower labor rates, taxes, rent, or other expenses. In some examples, therefore, the system can calculate the overall delivery costs for warehouses for analysis. The overall delivery cost can include the cost to package and ship an order, including the cost associated with the physical warehouse 108, labor, and shipping, among other things.

In addition to balancing workloads between physical warehouses 108, the provider can also make similar behind-the-scenes adjustments based on a number of other variables. The provider may choose to move inventory from a first physical warehouse 108 to a second physical warehouse due to an existing, or pending, labor shortage. The provider may choose to move inventory from a union warehouse 108 to a non-union physical warehouse 108, for example, in anticipation of a looming strike at the union warehouse 108 (or vice-versa). The provider may also choose to move inventory from one physical warehouse 108 to another physical warehouse 108 due to other labor shortages such as, for example, high turnover, illnesses, low unemployment, or other factors that affect staffing levels at a physical warehouse 108.

The provider may also choose to move inventory from one physical warehouse 108 to another physical warehouse 108 in light of other conditions such as construction, traffic issues, or street closures. The provider may also choose to move inventory from one physical warehouse 108 to another physical warehouse 108 in light of an impending snowstorm, hurricane, or other weather event. Using the system, therefore, the provider is free to make adjustments and can simply remap the relevant virtual warehouses 104 to different physical warehouses 108 as necessary.

In some cases, the provider need not bother the vendor with these changes. The vendor and/or the provider may prefer that the provider manage the physical network 106 behind-the-scenes. Other vendors may prefer a more transparent approach, however. In this case, the provider may enable vendors to opt-in to notifications related to modifications to the physical network 106. In some cases, this may enable vendors to adjust their virtual network 102 accordingly. In other cases, the vendor may need to know where inventory is actually located for tax, or other, purposes. In still other cases, the vendor may simply wish to know where his inventory is physically located.

Other vendors simply may not care about the physical network 106. Some vendors may have retained the provider precisely because they do not have the resources and/or the desire to manage their own storage and delivery operations. These "hands-off" vendors may be content to configure and operate the virtual network 102 without regard for the actual implementation by the provider. These vendors may be satisfied simply knowing that their orders are being fulfilled as agreed, without need to know the exact mechanisms used in their fulfillment.

Figure 3A:
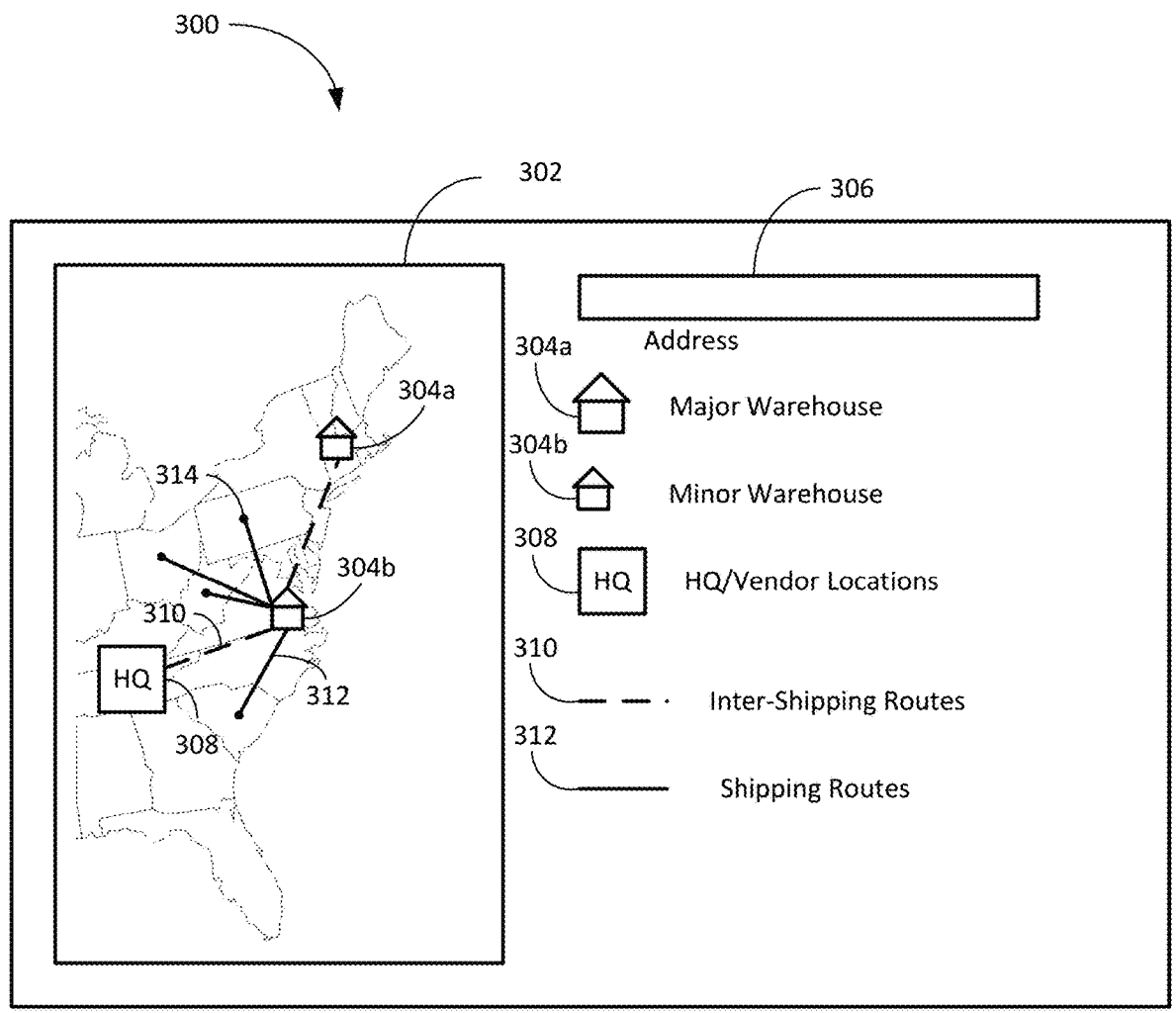
FIG. 3A depicts a portion of a graphical user interface (GUI) for a configuration of the virtual network by a vendor, in accordance with some examples of the present disclosure.

As shown in FIG. 3, examples of the present disclosure can also comprise a vendor graphical user interface (GUI) 300. The vendor GUI 300 can comprise, for example, a map window 302 to display a portion, or all, of the vendor's territory. The map window 302 can include a particular city, country, or the entire world depending on the extent of the vendor's desired territory. Indeed, the vendor may choose to expand or contract the map window 302 as the vendor's territory changes.

As mentioned above, and shown in FIG. 3, the vendor's main business may come from the East Coast, for example. In this case, the vendor can adjust the map window 302 (i.e. zoom in or out) to display the East Coast. In some cases, the vendor may zoom in on a particular city, for example, to accurately configure multiple virtual warehouses 104. Of course, the map window 302 could be used to display a smaller or larger territory based on the vendor's preferences. In some examples, the map window 302 could display, for example, a single state or region, a single country, a single continent, or the entire world.

The GUI 300 can also include one or more icons to enable the vendor to configure the virtual network 102. The GUI 300 can include, for example, one or more warehouse icons 304. In some examples, the warehouse icons 304 can include an icon for major warehouses 304a and an icon for minor warehouses 304b. The major warehouses 304a can be chosen, for example, in locations with high historical, or expected, sales, larger cities, cities with large transportation hubs, or warehouses close to the vendor's existing locations. The minor warehouses 304b, on the other hand, can be chosen, for example, in locations with lower sales expectations, smaller cities, or more remote locations. Minor warehouses 304b can also serve specialty markets. If the vendor sells licensed collegiate apparel, for example, sales may be high in smaller cities because of the locations of relevant schools. Thus, an otherwise small city may warrant a minor warehouse 304b due to its proximity to a participating college or university.

In some examples, the warehouse icons 304 can be "dragged and dropped" to be placed on the map. In some examples, the map window 302 can include "snaps" or other guides, similar to those used in CAD and graphics programs, to enable the virtual warehouses 104 to be easily placed in significant locations (e.g., in major cities or near airports). This provides the vendor with a user-friendly method to place warehouses on the map window 302. In some cases, because the warehouse icons 304 represent virtual warehouses 104, which will eventually be mapped to physical warehouses 108, the precise placement and location of the warehouse icons 304 on the map window 302 may not be particularly significant.

In other cases, the aforementioned snaps can be used to ensure virtual warehouses 104 are placed in particular locations. Thus, the map window 302 may only allow virtual warehouses 104 to be placed in locations within a predetermined proximity to physical warehouses 108, for example, or in major cities or locations with transportations hubs, among other things.

In still other examples, however, the GUI 300 can also include an address bar 306 or other data entry mechanism. The address bar 306 can enable the vendor to enter, for example, a city, town, exact address, or GPS coordinates for the virtual warehouse 104 placement. This can enable the vendor to precisely locate the virtual warehouse 104 based on historical or projected sales, proximity to other vendor facilities, provider facilities, or proximity to transportation hubs, among other things. The address bar 306 can be used instead of, or in addition to, the drag-and-drop feature discussed above.

In some examples, the GUI 300 can also include a headquarters and/or retail locations ("HQ") icon 308. The HQ icon 308 can enable the vendor to locate its existing locations in the map window 302. The existing locations can comprise the company headquarters, manufacturing facilities, shipping and receiving facilities, or retail locations, among other things. The HQ icon(s) 308 can be used to place existing facilities on the virtual network to establish internal and external virtual shipping routes—e.g., routes for in-bounding merchandise from existing locations to virtual warehouses 104—among other things.

In some examples, the GUI 300 can also include the ability to place virtual inter-shipping routes 310. Inter-shipping routes 310 can include shipping routes between existing facilities, as denoted by the HQ icon 308, and virtual warehouses 104, as indicated by the virtual warehouse icons 304a, 304b, or between virtual warehouses 104. This can enable the vendor to estimate the cost of "in-bounding" product to the virtual warehouses, which may be included as part of the fee paid to the provider, or the cost to move product from one virtual warehouse 104 to another.

Like the cost to ship and handle orders, the vendor may be charged for inter-shipping based on the locations of virtual warehouses 104 and/or physical facilities. In other words, if the vendor determines that product needs to be inter-shipped from one virtual warehouse 104 to another due to inventory levels, for example, the cost to do so can be calculated based on the cost to ship between the two locations. Similarly, the vendor can be charged based on the cost to ship from a particular virtual warehouse 104 to an in-bounding facility. Of course, any inter-shipping in the physical network 106 may be performed at the discretion of the provider, regardless of the status of the virtual network 102.

The inter-shipping icons 310 can comprise graphical lines that can be used to connect various components on the map window 302 (e.g., HQ icons 308 and warehouse icons 304). In some examples, the GUI 300 can enable the vendor to denote inter-shipping routes 310 simply by designating the end points of the route. In other examples, inter-shipping routes 310 may be based on known actual shipping routes, such as those found on a shipping carrier map.

In some examples, the GUI 300 can also include the ability to place virtual shipping routes 312. Like the virtual inter-shipping icon 310, the virtual shipping route icons 312 can be represented with a line between two end points (e.g., a warehouse icon 304 and a city or town 314). In some examples, the virtual shipping routes 312 can be distinguished from the virtual inter-shipping routes 310 with different line types (e.g., dashed vs. solid), different line colors, or different line weights, among other things.

The virtual shipping routes 312 can enable the vendor to designate virtual warehouses 104 for certain cities, for example, based on known shipping rates, previous experience, market research, or other factors. In some examples, the virtual shipping route 312 chosen by a vendor may actually cover a longer distance, but may be cheaper based on shipping rates. In other words, shipping companies may offer discounted rates from hubs due to high volume, or from small shipping facilities due to low volume. In some cases, shipping via a particular virtual shipping route 312 may enable the vendor to use ground shipping, for example, instead of two-day shipping.

Figure 3B:
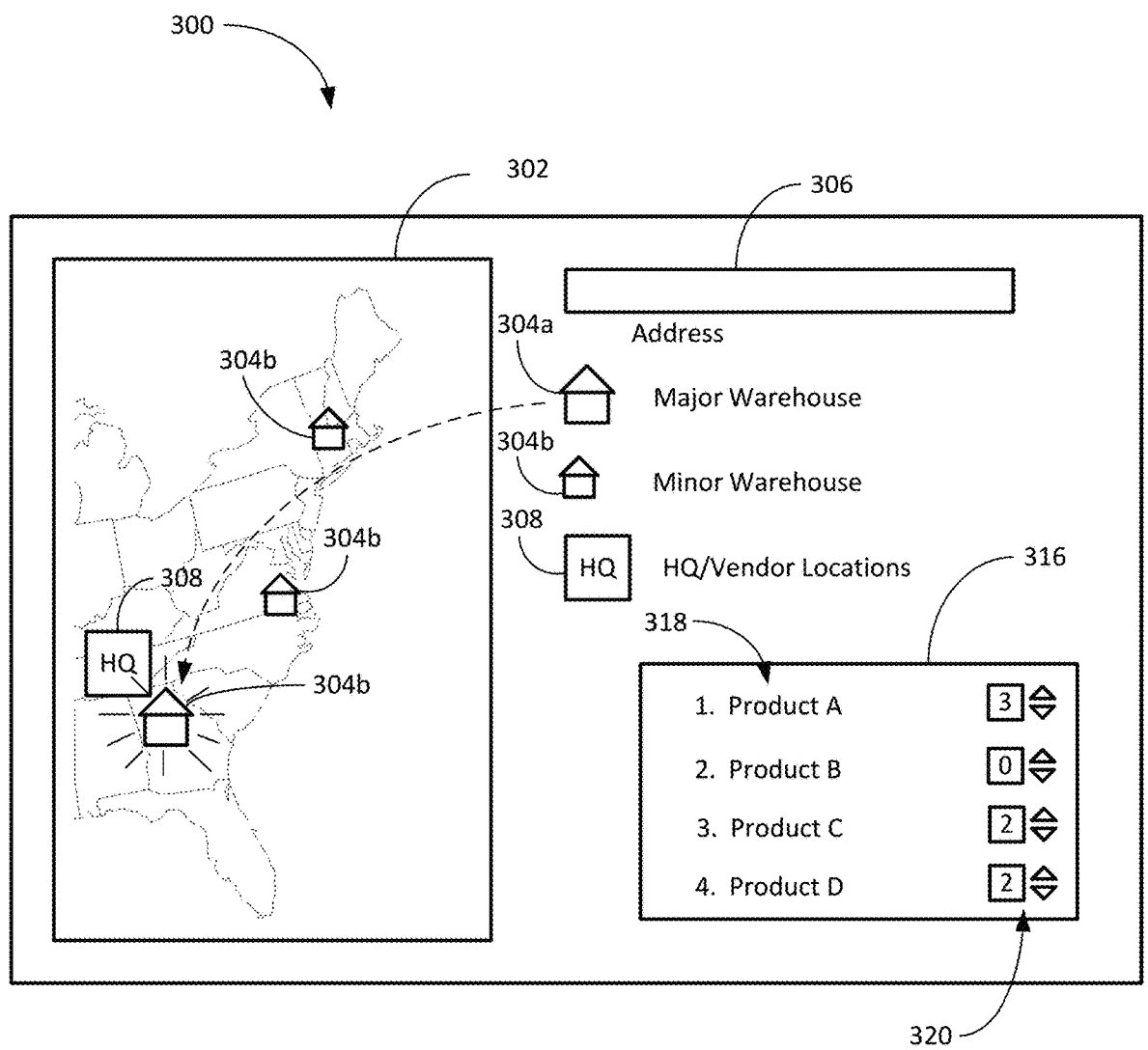
FIG. 3B depicts another portion of the GUI of FIG. 3A for the configuration of the virtual network by the vendor, in accordance with some examples of the present disclosure.

As shown in FIG. 3B, in some examples, upon selecting and placing the warehouse icon 304—whether by dragging and dropping or using the address bar—the GUI 300 can also include an inventory manager 316. The inventory manager 316 can enable the vendor to choose the allocation of products—e.g., as an initial allocation, an updated allocation, or for restocking—to be stored in, and shipped from, the selected virtual warehouse 104. To this end, the inventory manager 316 can include a product description 318 and an inventory level 320 component. In some examples, the product description can include the product brand, product name, key words, UPC number, or other relevant information. The inventory level 320 can comprise the number of units, boxes, cartons, gross, or other relevant inventory unit for each product.

In some examples, depending on the size of the vendor, the inventory manager 316 can simply include a list of all of the products the vendor sells. The vendor can then use the inventory level 320 to set the number of items, cartons, pallets, gross, etc. of that product to be allocated to that virtual warehouse 104. For larger vendors, on the other hand, a simple list of all products may be too unwieldy. In this case, the product description 318 can include a keyword or stock keeping unit (SKU) search, for example, to enable the vendor to designate the appropriate products. In still other examples, the product description 318 can be associated with input from a bar code scanner, or other data entry device, to enable the vendor to choose products for each virtual warehouse 104.

Figure 4:
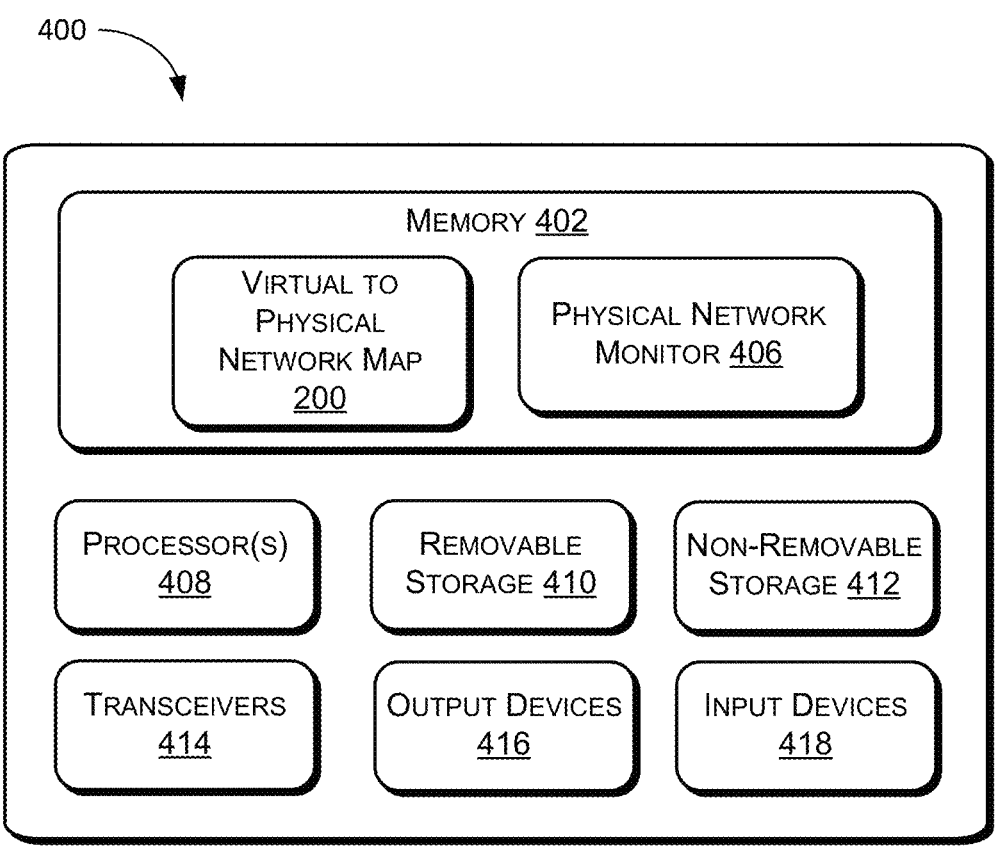
FIG. 4 is a component level diagram of a physical warehouse management module (PWMM), in accordance with some examples of the present disclosure.

As shown in FIG. 4, examples of the present disclosure can also comprise a physical warehouse management module (PWMM) 400. FIG. 4 illustrates a component level view of the PWMM 400. As discussed below, the PWMM 400 is configured to receive and manage requests to fill orders from the vendor or customers. The PWMM 400 can receive orders from the vendor or customers based on the virtual network 102 and convert these orders into orders based on the physical network 106, among other things. As discussed below, the PWMM 400 can also contain heuristic algorithms designed to refine and optimize the virtual-to-physical map 200 based on a number of variables.

As illustrated, the PWMM 400 can comprise a system memory 402 storing at least the virtual-to-physical network map (or overlay) 200 and a physical network monitor 406. As discussed above, the virtual-to-physical network map 200 can include a translation from the virtual network 102 configured by the vendor to the physical network 106 configured by the provider (based on the location of actual assets). The virtual-to-physical network map 200 enables the reconfiguration of the physical network 106 without reconfiguration to the virtual network 102.

In some examples, the PWMM 400 can also include a physical network monitor 406. As the name implies, the physical network monitor 406 can monitor one or more parameters of the physical network 106 and respond as necessary to changing market forces. The physical network monitor 406 can receive data from each physical warehouse 108, for example, related to handling times (e.g., the delay between when an order is received and when the package is shipped), shipping times, and warehouse operating levels (e.g., the percentage of the total warehouse capacity at which the physical warehouse 108 is operating). In some examples, the physical network monitor 406 can also track labor costs at each physical warehouse 108.

In some examples, the physical network monitor 406 can also monitor differences between actual shipping and handling costs at each physical warehouse 108 compared to virtual shipping and handling costs based on the vendor's virtual network 102. Overall handling costs can include the cost to pull the order from warehouse shelves, pack the order, and prepare the order for shipment, for example, including labor, packing materials, and warehousing costs, among other things. This can enable the PWMM 400 to identify potential cost savings for the provider by reconfiguring the physical network 106. In some examples, for those vendors who opt to receive this data, these differences can also identify potential cost savings to the vendor by reconfiguring the virtual network 102.

In some examples, the physical network monitor 406 can monitor both networks 102, 106 constantly and provide real-time suggestions or automatic updates to the physical network 106. In other examples, the physical network monitor 406 can monitor the networks 102, 106 periodically and provide performance reports for analysis by the provider and/or vendor. In some examples, as discussed below, the physical network monitor 406 in the PWMM 400 can iteratively compare the physical network 106 and the virtual network 102 and adjust one or both to optimize the solution.

The PWMM 400 can also include processor(s) 408, removable storage 410, non-removable storage 412, transceivers 414, output device(s) 416, and input device(s) 418. The PWMM 400 may additionally contain a policy engine to receive, create, transmit, and manage physical network 106 policy rules.

In various implementations, system memory 402 is volatile (such as RAM), non-volatile (such as ROM, flash memory, etc.), or some combination of the two. In some examples, as discussed above, the virtual network-to-physical network map 200 can include a mapping from the virtual network 102 created by the vendor to the physical network 106 managed by the provider. This can enable the PWMM 400 to translate orders received from the vendor or customers that are based on the virtual network 102 into orders fulfilled with actual products stored in the physical warehouses 108.

In some examples, the memory 402 can also comprise a physical network monitor 406. The physical network monitor 406 can monitor the performance of the physical network 106 with respect to, for example, order locations, order fulfillment times, shipping times and costs, warehouse capacities, and other factors. The physical network monitor 406 can enable the physical network 106 to be optimized in light of physical sales to consumers and other data. In some examples, this data can also be used to optimize the virtual network 102. As discussed below, the PWMM 400 can include optimization software (e.g., heuristic algorithms) to enable the system to converge on one or more optimized solutions.

In some examples, modifications to the physical network 106 in response to orders or other market factors may be shared with the vendor to facilitate modification of the virtual network 102. In this manner, the physical network monitor 406 can enable both the virtual network 102 and the physical network 106 to converge toward optimization over time (i.e., to the extent relevant market factors are stable). In other examples, optimization of the physical network 106 over the virtual network 102 can represent a potential income stream for the provider.

In some implementations, the processor(s) 408 is a central processing unit (CPU), a graphics processing unit (GPU), or both CPU and GPU, or any other sort of processing unit. The PWMM 400 may also include additional data storage devices (removable and/or non-removable) such as, for example, magnetic disks, optical disks, or tape. Such additional storage is illustrated in FIG. 4 by removable storage 410 and non-removable storage 412.

Non-transitory computer-readable media may include volatile and nonvolatile, removable and non-removable tangible, physical media implemented in technology for storage of information, such as computer readable instructions, data structures, program modules, or other data. System memory 402, removable storage 410 and non-removable storage 412 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the PWMM 400. Any such non-transitory computer-readable media may be part of the PWMM 400.

In some implementations, the transceivers 414 include any sort of transceivers known in the art. For example, the transceivers 414 may include wired communication components, such as an Ethernet port, for communicating with other networked devices. Also or instead, the transceivers 414 may include wireless modem(s) to facilitate wireless connectivity with other computing devices. Further, the transceivers 414 may include a radio transceiver that performs the function of transmitting and receiving radio frequency communications via an antenna (e.g., WiFi or Bluetooth®).

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), a touchscreen, or one or more other types of keys or buttons, and may also include a joystick, wheel, and/or designated navigation buttons, or the like.

Figure 5:
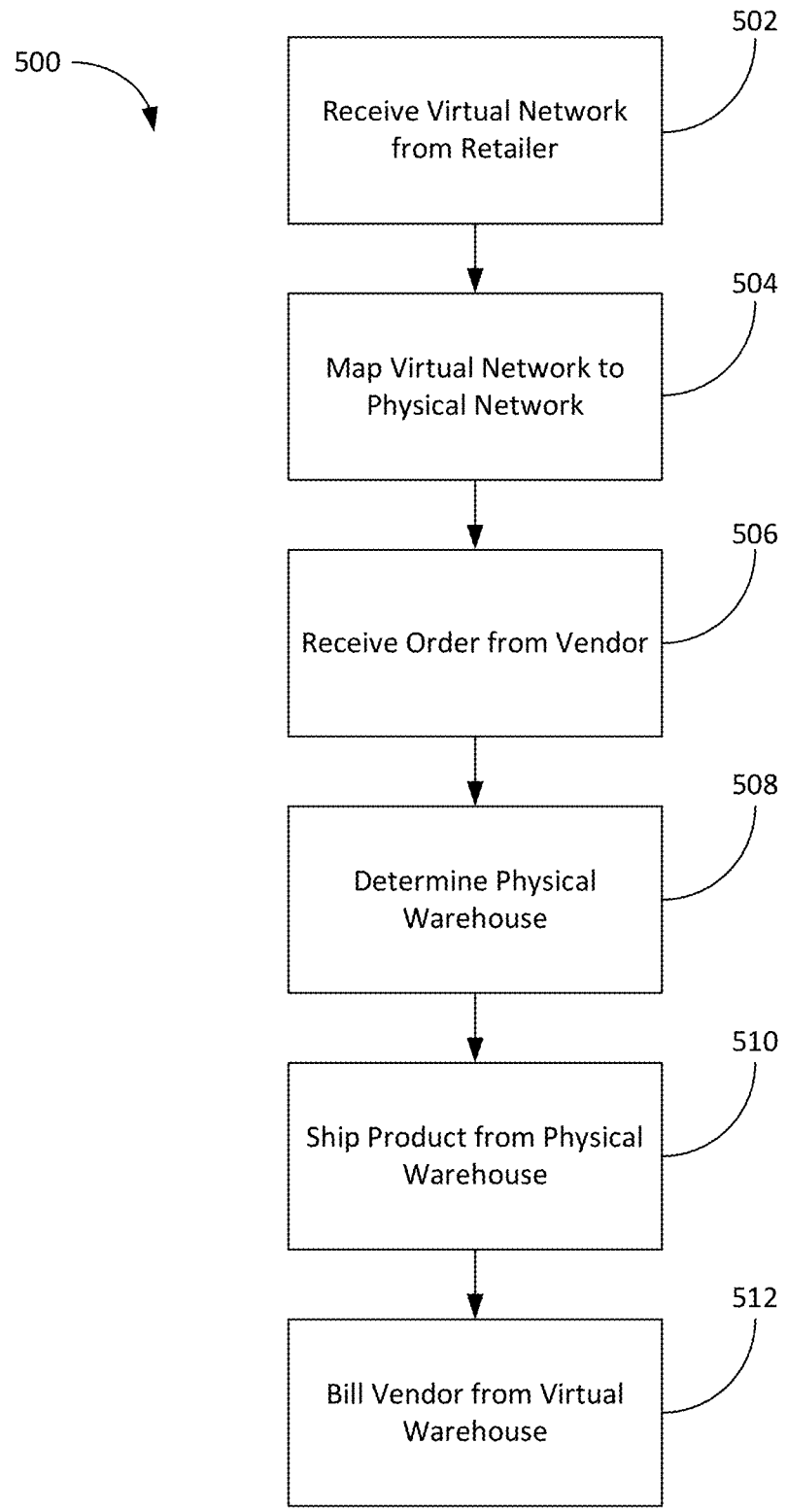
FIG. 5 is a flowchart depicting a process for fulfilling an order with the physical network of FIG. 1B in response to an order from the vendor based on the virtual network of FIG. 1A, in accordance with some examples of the present disclosure.

As shown in FIG. 5, examples of the present disclosure can also comprise a method 500 for providing logistics, warehousing, and shipping using a virtual network 102 overlay on a physical network 106. At 502, the provider can receive the virtual network 102 from the vendor. In some examples, the virtual network 102 can be in the form of a map of a portion of the country, for example, designating the locations of one or more virtual warehouses 104. In other examples, the locations of existing physical warehouses 108 can be provided to the vendor to enable the vendor to choose which physical warehouses 108 he thinks would be most appropriate.

The virtual warehouse 104 locations can be picked by the vendor based on, for example, the vendor's existing sales data, projected sales data, or other market analysis. The virtual network 102, therefore, can represent the vendors "ideal" distribution network based on the information available to the vendor. Of course, the success of the virtual network 102, and ultimately the storage and shipping costs associated with the vendor, is largely dependent on the acumen of the vendor—i.e., the vendor's ability to predict the market and his customers.

At 504, the provider can then map the virtual network 102 to the physical network 106. The physical network 106 represents the warehouses and other components that the provider physically owns and/or operates and has chosen to map to the virtual warehouses 104. As such, the physical network 106 represents the provider's ideal network based, at least in part, on the virtual network 102. As discussed above, due to differences in market data, the physical network 106 need not be particularly similar to the virtual network 102. In other words, based on a better, or different, understanding of the market, the physical network 106 may bear little resemblance to the virtual network 102. Indeed, every physical warehouse 108 could be in a different city than each corresponding virtual warehouse 104.

As an initial matter, for each virtual warehouse 104, for example, the provider may simply pick the physical warehouse 108 in closest proximity. This may reduce the risk to the provider at startup, for example, simply because the virtual network 102 and the physical network 106 will be substantially similar. As a result, any errors in the configuration of the initial networks 102, 106 will fall to the vendor. In other words, if the vendor has configured the virtual network 102 poorly, but the physical network 106 is substantially the same, then any additional costs in actual shipping and handling from the physical warehouse 108 will also be reflected in the shipping and handling costs of the virtual warehouse 104.

In other examples, the virtual-to-physical map 200 can include a multi-factor analysis. In other words, if the provider has multiple warehouses 108 in a given location (e.g., in a large city, in the same state, or region), for example, the difference in proximity of multiple physical warehouses 108 to the proposed virtual warehouse 104 may be inconsequential. In this situation, the provider may consider additional factors in addition to, or instead of, the proximity of the physical warehouse 108 to the virtual warehouse 104. In some cases, the presence of multiple virtual warehouses 104 in a single city, for example, may lead to multiple virtual warehouses 104 being mapped to a single physical warehouse 108 (or vice-versa).

The provider may consider, for example, the available capacity and performance of a physical warehouse 108. If a physical warehouse 108 is at, or near, its storage or handling capacity, for example, then this can weigh against mapping additional virtual warehouses 104 to that physical warehouse 108. Similarly, if a particular physical warehouse 108 is currently performing poorly (e.g., it takes longer than expected to fulfill and ship orders), then that can also weigh against mapping additional virtual warehouses 104 to that physical warehouse 108. If the workers at a particular warehouse 108 are on strike, for example, or a strike is imminent, that can also weigh against mapping additional virtual warehouses 104 to that physical warehouse 108.

The provider may also consider transportation factors for each physical warehouse 108. Transportation factors can include, for example, the proximity of the physical warehouse 108 to shipping hubs, highways, or airports and the capacities thereof. The capacity of a major international airport, for example, may be tens or hundreds of times the capacity of a local or regional airport. Transportation factors may also include transient issues such as, for example, labor shortages or strikes in a particular transportation segment, weather events (e.g., blizzards and hurricanes), or major traffic events.

At 506, the provider can receive an order from the vendor and/or a customer of the vendor. The vendor can supply the address for the in-bounding facility to which the order is to be delivered and one or more virtual warehouses 104 chosen to fulfill the order. The vendor may choose the virtual warehouse 104 based on its proximity to the delivery address, for example, or based on its proximity to a transportation hub or other component. In some examples, the virtual warehouse 104 may be selected automatically based on one or more factors without input from the vendor. In some examples, the virtual warehouse 104 can be automatically selected by a computer algorithm, or other suitable means, using, for example, the proximity of the virtual warehouse 104 to the delivery address, the availability of a particular product required to fill the order, current warehouse capacities, or other factors. In some examples, the vendor can also include a bill of lading, shipping list, routes, and other information.

At 508, using the previously configured virtual-to-physical map 200, the provider can determine the physical warehouse(s) 108 that correspond to the chosen virtual warehouse(s) 104. As discussed above, the physical warehouse 108 can be chosen based on a number of factors. As discussed below, the physical warehouse 108 can also be dynamically updated in response to market conditions to enable the provider and/or vendor to react to changing market conditions.

At 510, the provider can ship the order from the physical warehouse 108 and pay the attendant shipping fees. At 512, the vendor can be billed based on the shipping fees that would have been incurred if the order had been shipped from the designated virtual warehouse 104. Thus, if the provider is able to fulfill the order from the physical warehouse 108 at a lower cost than if the order had been shipped from the chosen virtual warehouse 104, then the order may represent an additional revenue stream for the provider. This revenue stream can be based on the actual shipping cost versus the virtual shipping cost. This revenue may be charged to the vendor in addition to the fees paid to the provider for logistics, warehousing, and other services. Of course, the opposite is also true, and it is possible that the provider will incur additional shipping costs from a poorly chosen physical warehouse 108 instead of the designated virtual warehouse 104. In this case, the difference in shipping costs represents a potential loss to the provider.

Figure 6:
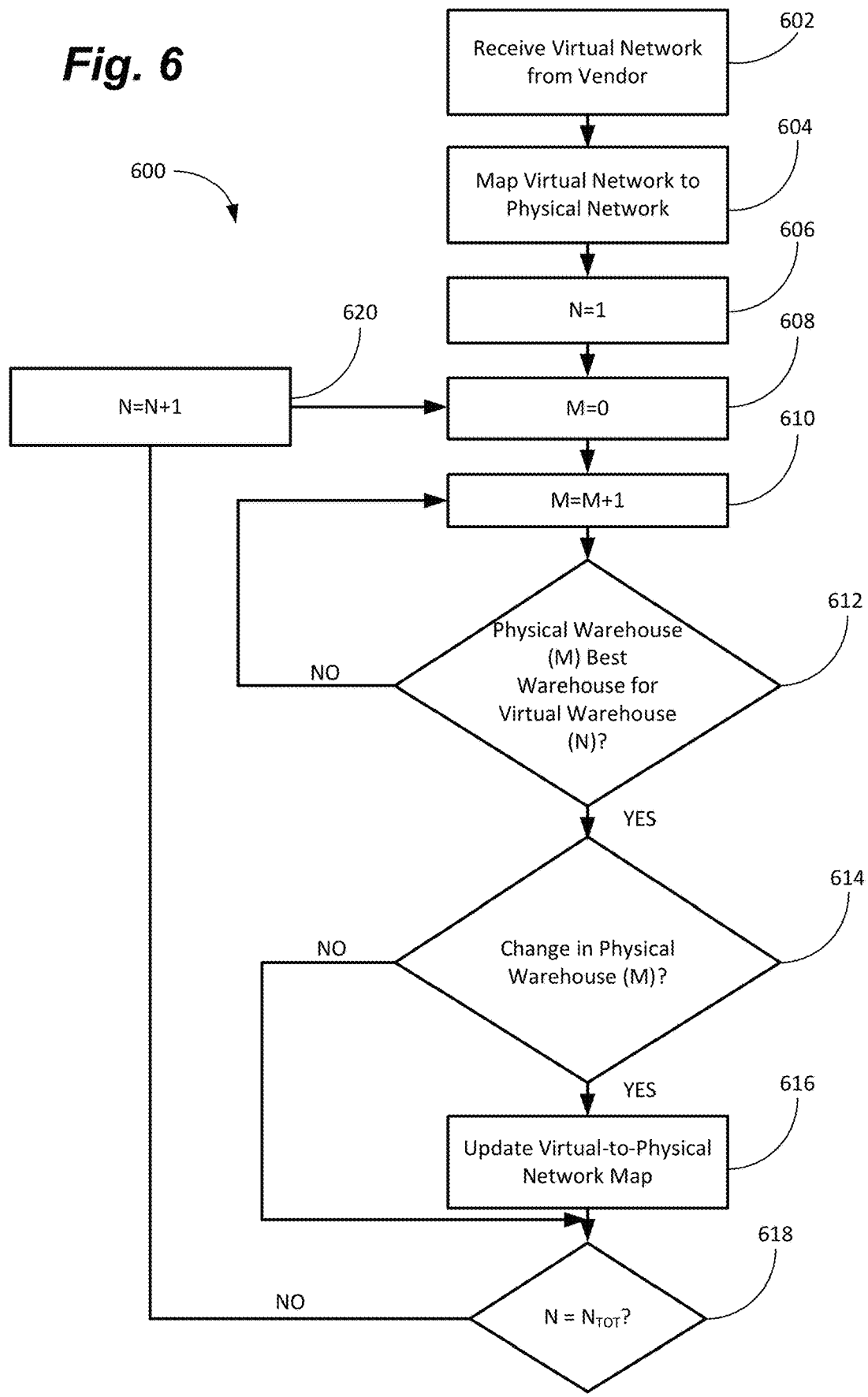
FIG. 6 is a flowchart depicting a process for reevaluating the physical warehouses of FIG. 1B that are mapped to the virtual warehouses of FIG. 1A based on one or more factors, in accordance with some examples of the present disclosure.

As shown in FIG. 6, the ability to review and update the virtual-to-physical map 200 enables the provider to maintain an efficient mapping without disturbing the daily operations of the vendor. In other words, if one or more physical warehouses 108 need to be changed (regardless of the reason), the mapping can simply be updated from the relevant virtual warehouse 104 to the new physical warehouse 108. Thus, while inventory may need to be moved or rerouted, from the vendor's point of view nothing has changed and the vendor continues to use an unchanged virtual map. In this manner, the provider can utilize potentially superior intelligence to improve the efficiency of the physical network 106. In some cases, this intelligence may be shared with the vendor in real-time, or periodically, to enable an associated refinement of the virtual network 102.

Examples of the present disclosure, therefore, can comprise a system 600 for determining if any of the physical warehouses 108 and/or any of the virtual warehouses 104 need to be remapped. This process can be performed in real-time, based on real-time data, or can be performed periodically based on data collected over a predetermined period. The data can include the number and location of orders, the performance, available capacity of physical warehouses 108, updates in shipping and labor costs, potential labor shortages or strikes, among other things.

As before, at 602, the provider can receive the virtual network 102 as configured by the vendor. The virtual network 102 can be in the form of a map of a portion of the country, for example, designating the locations of one or more virtual warehouses 104. The warehouse locations can be picked by the vendor based on, for example, the vendor's existing sales data, existing successful warehouse or shipping operations, projected sales data, or other market analysis. In other examples, the vendor may simply choose locations close to existing vendor facilities. For the inexperienced vendor, the virtual network 102 can simply be a best guess based on where the vendor thinks his products will be successful. The virtual network 102, therefore, represents the vendor's perceived "ideal" distribution network based on the information (or lack thereof) available to the vendor.

At 604, the provider can then map the virtual network 102 to the physical network 106. The physical network 106 represents the warehouses and other components that the provider physically owns and/or operates. As an initial matter, for each virtual warehouse 104, the provider may simply pick the physical warehouse 108 in closest proximity, for example, or the warehouse 108 within a predetermined radius, for example, with excess capacity.

In some examples, all physical warehouses 108 within a predetermined radius (e.g., 5, 10, 25, or 50 miles) can be identified, for example, and the assignment can be made based on additional factors such as labor costs and available warehouse capacity. Of course, the radius within which warehouses 108 can be considered can vary in different markets. In New York City, for example, the radius may be 5 miles due to traffic. In less traffic prone areas, on the other hand, a larger radius of 25 or 50 miles may not significantly affect delivery time and cost.

In some cases, however, the provider may simply have better information than the vendor. The provider may have a large storage and fulfillment business, for example, while the vendor is a start-up or new to fulfillment and delivery. In this case, rather than a best guess, therefore, the vendor may be able to rely on data from similarly situated existing clients of the provider. In addition, the provider may also have extensive shipping and warehousing experience resulting in superior information regarding the cost to handle and ship goods. Thus, the provider may be able to configure a more efficient initial physical network 106. In addition, depending on the level of information shared with the vendor (by the vendor's choice or the provider's choice), the provider may continue to enjoy superior intelligence as to the larger market. As discussed above, this may result in an income stream for the provider due to differences in cost between operating the virtual network 102 and the physical network 106.

To this end, the virtual-to-physical map 200 can periodically (or constantly) be reviewed for efficiency. To iterate through each combination of virtual and physical warehouses, therefore, virtual warehouses 104 can be iterated with the variable N, while physical warehouses 108 can be iterated with the variable M. At 606, therefore, N can be set to 1 to designate the first virtual warehouse 104 in the vendor's virtual network 102. At 608, to check each physical warehouse 108 against each virtual warehouse 104, M can be reset to zero at the beginning of each iteration. At 610, in the first iteration, M can be increased by 1 to designate the first physical warehouse, PW(M).

At 612, the system 600 can determine whether the current physical warehouse 108, PW(M), is the best choice for the currently selected virtual warehouse 104, VW(N). As discussed above, this determination can be based on one or more factors. In some examples, the determination can be based solely on the proximity of PW(M) to VW(N). In other examples, the determination can include a multi-factor analysis. In other words, the provider may consider additional factors in addition to, or instead of, the proximity of the physical warehouse 108 to the virtual warehouse 104.

The provider may consider, for example, the available capacity and performance of PW(M) compared to nearby physical warehouses 108. If PW(M) is above a predetermined percentage of its storage capacity (e.g., above 90%), for example, then the system 600 may determine that PW(M) is not the best physical warehouse 108 for VW(N). Similarly, if PW(M) is currently performing poorly (e.g., PW(M) takes longer than expected to fulfill and ship orders), then the system 600 may determine that PW(M) is not the best physical warehouse 108 for VW(N). If the workers at PW(M) are on strike, for example, or a strike is imminent, then the system 600 may determine that PW(M) is not the best physical warehouse for VW(N).

The system 600 may also consider transportation factors for each physical warehouse 108. Transportation factors can include, for example, the proximity of the physical warehouse 108 to shipping hubs, highways, or airports. In some cases, routes may be discounted by carriers, for example, such that certain routes are cheaper even though they cover longer distances. Transportation factors may also include transient issues such as, for example, labor shortages or strikes in a particular transportation segment, weather events (e.g., blizzards and hurricanes), or major traffic events.

At 614, the system 600 can determine if there has been a change to the relevant physical warehouse 108, PW(M), associated with the current virtual warehouse 104, VW(N), based on one or more of the factors discussed above. If there is no change, then no update is needed to the virtual-to-physical map 200, and the method iterates to the next virtual warehouse 104, and the process continues.

At 616, if there has been a change, on the other hand, the system 600 can update the virtual-to-physical map 200 to reflect the change. Because the changes can be made behind-the-scenes, however, the change can be completed quickly and without disturbing the vendor. This can enable the system 600 to react quickly to changing market forces. At 618, the system 600 can determine if all of the virtual warehouses 104 have been reviewed—i.e., is N greater than the total number of virtual warehouses 104, $N_{TOT}$, designated by the vendor. If so, then the review is complete. If not, then the review continues with the next virtual warehouse 104.

At 620, if additional virtual warehouses 104 remain for review, N can be increased by one to review the next virtual warehouse 104, VW(N+1). The virtual warehouses 104 can be reviewed in any order (e.g., numerically, by location, or by size) or in no order. As the system 600 iterates through the virtual warehouses 104, each virtual warehouse 104 is reviewed to ensure the efficiency of the physical network 106.

At 608, the designation for the physical warehouses 108, M, can again be set to zero to review each physical warehouse 108 against the next virtual warehouse 104, VW(N+1). At 610, M can be increased by one to recheck VW(N+1) against all physical warehouses 108 starting with PW(1). In this manner, each physical warehouse 108, PW(M), can be checked against each virtual warehouse 104, VW(N), to ensure the most efficient solution has been chosen for each combination based on current conditions. In addition, through this iterative process, and by virtue of updated market intelligence, the virtual-to-physical map 200 can both (1) converge on the most efficient solution (in light of all the relevant factors) and (2) react to changing market conditions. Because the vendor need not be involved (although he can be), the system 600 enables the provider to react to market forces and take advantage of superior (e.g., larger) market knowledge.

Figure 7:
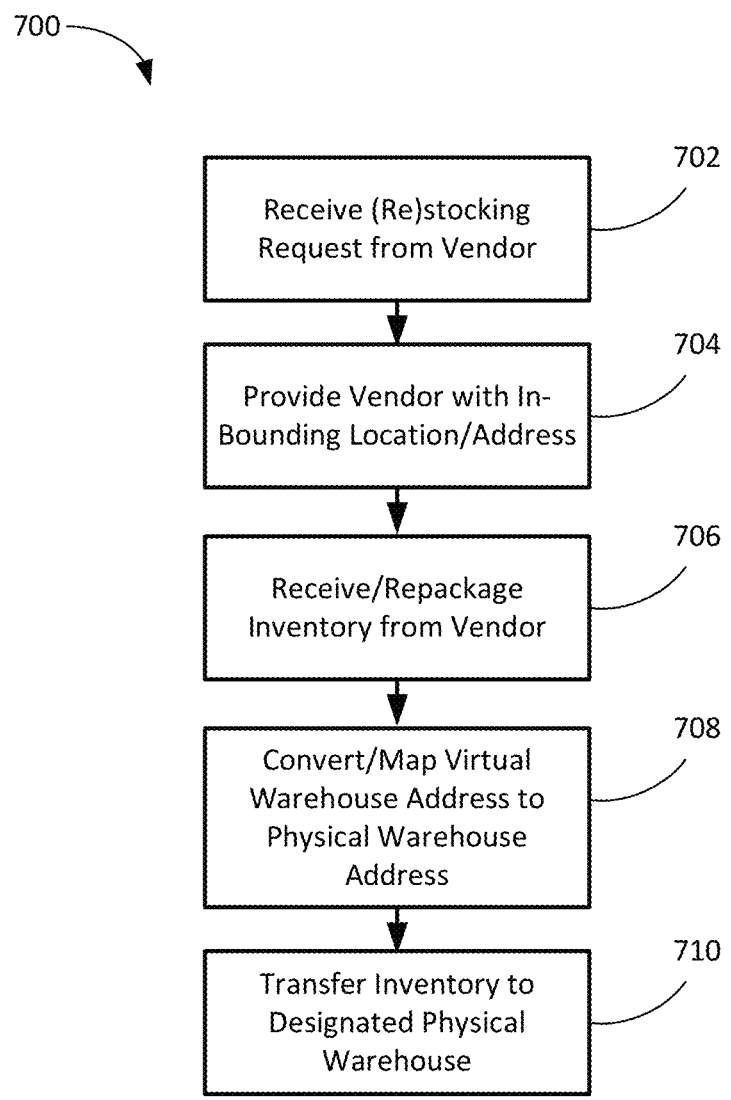
FIG. 7 is a flowchart depicting a process for receiving and distributing, by the provider, one or more goods associated with the vendor, in accordance with some examples of the present disclosure.

As shown in FIG. 7, examples of the present disclosure can also include a method 700 for the provider to receive and distribute one or more goods associated with the vendor. To this end, at 702, the provider can receive a stocking or re-stocking request from the vendor. The request can include the number of each item to be (re)stocked at each virtual warehouse 104. The virtual warehouses 104 may be identified by the vendor using a virtual address, identification number, bar code, or other means and can be based on the virtual network 102 discussed above. As such, the vendor operates as if the goods are in locations designated by his choice of virtual warehouse 104 and pays the cost to in-bound to, and ship from, these virtual locations. In some cases, the vendor may have no knowledge of where the goods are actually being stored.

At 704, the provider can supply one or more "in-bounding" locations, or in-bounding centers, to the vendor. The in-bounding centers can comprise facilities configured to receive product from the vendor and then distribute the products to the relevant physical warehouses 108 according to the current virtual-to-physical map 200. In some examples, the in-bounding centers can comprise one or more existing physical warehouses 108 with appropriate receiving facilities. In other examples, the in-bounding centers can comprise shipping and receiving centers specifically configured to receive and distribute the products. In still other example, the in-bounding centers can comprise facilities associated with other divisions of the provider (e.g., the provider's standalone shipping division) or partners of the provider (e.g., a UPS® or FedEx® facility).

In some examples, the in-bounding centers can be chosen based, in whole or in part, on their proximity to the vendor. In other examples, in addition or instead of their location, the in-bounding centers can be chosen based on the product to be stocked. In other words, some in-bounding centers may be designated for products below a certain size or weight, for example, vendors that have certain sales volumes, or for products that require special handling (e.g., hazardous materials).

At 706, the in-bounding center can receive the products and repackage them if necessary. If the vendor provides product for multiple warehouses in a single package, for example, the inbounding center may repackage the products into a suitable number of separate packages. In some cases, the vendor may provide product packaged separately for two different virtual warehouses 104, for example, while multiple virtual warehouses 104 are mapped to the same physical warehouse 108. As a result, the two packages from the vendor may need to be repackaged together. Conversely, the opposite may be true. In other words, the vendor may select a single virtual warehouse 104 in New York City, for example; however, the provider has multiple physical warehouses 108 in New York City to reduce travel times. In this situation, a single virtual warehouse 104 may map to multiple physical warehouses 108. In this instance, a single package may need to be repackaged for distribution to multiple physical warehouses 108.

At 708, the provider can convert the virtual warehouse 104 addresses—provided by the vendor—to physical warehouse 108 addresses in the provider's distribution system using the virtual-to-physical map 200. The virtual warehouses 104 can be mapped to the physical warehouses 108 based on the aforementioned mapping processes. This can include, for example, the virtual network 102 map created by the vendor (FIG. 1A), the physical network 106 map created by the provider (FIG. 1B), the virtual-to-physical mapping process (FIGS. 2A and/or 2B), and any updates to the virtual-to-physical map 200 due to changing conditions. See, e.g., FIG. 6.

In this regard, because the virtual-to-physical map 200 can be changed dynamically, mappings can be corrected even when changes occur between the times the (re)stocking order is received from the vendor and the product is shipped out from the in-bounding center. Depending on routing, for example, the order may be able to be redirected en route in response to changes in the physical network 106. If, for example, workers at a first physical warehouse 108 go on strike during shipment, the package can be rerouted to a second physical warehouse 108 that is not on strike.

In addition, because the changes are made on the provider-side, the remapping process can be transparent to the vendor. In other words, in some cases, the changes can be made completely without the knowledge of the vendor—e.g., for the "just get it done" vendor or the unsophisticated vendor who may simply find the information overwhelming. In other cases, vendors may wish to be updated as to the actual locations of their goods for tax purposes, tracking, or other reasons. In some examples, vendors can be provided periodic updates comprising market data and changes to the virtual-to-physical map 200 to improve their situational awareness. At 710, the packages can then be transferred to their respective physical warehouses 108 for (re)stocking.

As shown in FIG. 8, examples of the present disclosure can also comprise a shipping label 800 designed to facilitate the virtual-to-physical mapping process. The shipping label 800 can comprise a self-adhesive layer, or other means, to attach it to the package to be shipped. In some examples, the shipping label 800 can be generated at the in-bounding center to provide the necessary checks and addresses and/or associated identifiers, such as barcodes, QR codes, etc., prior to shipping. This can enable the address and contents of the package to be verified, e.g., by scanning the identifiers that are associated with particular addresses or fields of the shipping label 800.

To this end, the shipping label 800 can comprise, for example, an in-bounding address window 802, a physical warehouse address window 804, a virtual warehouse address window 806, and a bill of lading window 808. As the name implies, the in-bounding address window 802 can include the address of the in-bounding center from which the package of goods is originating. In this manner, the in-bounding address window 802 essentially acts as a return address for the package.

The physical warehouse address window 804 can include the address for the physical warehouse 108 to which the package is being sent. Because the physical warehouse address is not included before the package is received at the in-bounding center, the address of the physical warehouse assigned to each virtual warehouse 104 can remain unknown to the vendor. In other words, when in-bounding the merchandise, the vendor need only send the package to the in-bounding center and provide the address of the associated virtual warehouse 104. The in-bounding center can then associate the virtual warehouse 104 address with a physical warehouse address and add the physical warehouse address to the shipping label 800. This can be advantageous if the locations of the physical warehouses are to be protected for business or security reasons, for example.

The virtual warehouse address window 806 can include the address for the virtual warehouse 104 designated by the vendor. In some examples, as shown the virtual warehouse window 806 can be removable. In other words, the virtual warehouse 104 address can be included on the shipping label 800 to enable a worker at the inbounding center to check the label against a shipping manifest, for example, to confirm that the package is going to the appropriate physical warehouse 108 based on the provided virtual warehouse 104. After confirmation, however, the virtual warehouse address window 806 can be removed to avoid confusion during shipping. To this end, the virtual warehouse address window 806 can peel off (shown), tear off, or otherwise be removable by the worker.

In some examples, the shipping label 800 can also comprise a bill of lading 808. The bill of lading 808 can comprise a detailed listing of the goods to be shipped to the physical warehouse 108. This can be useful when, for example, multiple products are received at the in-bounding center in a single package and must be repackaged by the provider prior to shipment. Like the virtual warehouse address window 806, the bill of lading can be compared by the worker to a shipping list to confirm that the correct items have been included in the package. In some examples, the bill of lading 808 can also be removable to conceal the contents of the package during shipping.

As discussed above, examples of the present disclosure can comprise systems and methods for providing logistics, warehousing, shipping, and handling of products for vendors. The system can enable vendors to take a more active part in designing and maintaining logistics networks in a virtual setting to meet their warehousing, shipping, and handling needs in exchange for lower handling and/or shipping rates, among other things. This can enable the vendor to leverage sales history, research, and other institutional knowledge, for example, to reduce their storage and delivery costs.

Providers, in turn, can use the virtual network to configure a physical network based on their existing warehouse, shipping, and logistics networks. In some cases, such as when the vendor has superior intelligence, the physical network may closely mirror the virtual network. This reduces risk for the provider, but also limits potential revenue. In other cases, the provider may have a broader or better view of the market, including data from multiple similarly situated vendors (among other things), and may design a significantly different physical network. When the provider predicts the market more accurately than the vendor does, this can represent a revenue stream for the provider. Conversely, when the provider predicts the market less accurately than the vendor does, this can represent a liability for the provider.

The terms "vendor" and "provider" are used herein to simplify the disclosure. These terms are not intended to limit the disclosure. As used herein, the term "vendor" is equally applicable to retailers, wholesalers, direct marketers, and other types of merchants offering goods for sale. Similarly, the term "provider" is described above as a logistics, shipping, and warehousing provider, but is equally applicable to companies providing only some of these services as well as companies providing additional services.

While several possible examples are disclosed above, examples of the present disclosure are not so limited. For instance, while a system is described primarily for use with online sales and fulfillment, the system is equally applicable to other types of businesses such as, for example, phone or mail order sales. In addition, the location and configuration of various features of examples of the present disclosure such as, for example, the GUI, the physical computer implementation, and the various virtual and physical networks can be varied according to a particular geographical area, business segment, or customer type. Such changes are intended to be embraced within the scope of this disclosure.

The specific configurations, choice of materials, and the size and shape of various elements can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A method comprising:
   receiving a virtual network configured by a vendor, the virtual network comprising a plurality of virtual warehouses;
   selecting a physical network based at least in part on the virtual network, the physical network comprising a plurality of physical warehouses that each store a plurality of physical items;
   mapping the virtual network to the physical network to create a virtual-to-physical map that is used to facilitate a fulfillment of orders, placed by customers of the vendor, for physical items of the plurality of physical items;
   based at least in part on mapping the virtual network to the physical network to create the virtual-to-physical map, determining that a first physical warehouse of the plurality of physical warehouses provides a lower overall delivery cost, for delivering one or more physical items to a destination, from a first virtual warehouse to the destination than a second physical warehouse of the plurality of physical warehouses from the first virtual warehouse to the destination; and
   based at least in part on determining that the first physical warehouse of the plurality of physical warehouses provides the lower overall delivery cost from the first virtual warehouse to the destination than the second physical warehouse of the plurality of physical warehouses from the first virtual warehouse to the destination, updating the virtual-to-physical map to replace the second physical warehouse with the first physical warehouse.

2. The method of claim 1, wherein determining that the first physical warehouse provides the lower overall delivery cost from the first virtual warehouse than the second physical warehouse comprises:
   determining that the first physical warehouse is in closer proximity to the first virtual warehouse than the second physical warehouse.

3. The method of claim 1, wherein determining that the first physical warehouse provides the lower overall delivery cost from the first virtual warehouse than the second physical warehouse comprises:
   determining that the first physical warehouse is operating at a lower capacity than the second physical warehouse.

4. The method of claim 3, wherein determining that the first physical warehouse is operating at the lower capacity than the second physical warehouse comprises:
   determining that the first physical warehouse is operating below 80% of total capacity; and
   determining that the second physical warehouse is operating above 90% of total capacity.

5. The method of claim 1, further comprising:
   determining that a plurality of orders associated with the vendor are proximate a geographical location;
   wherein determining that the first physical warehouse provides the lower overall delivery cost from the first virtual warehouse than the second physical warehouse comprises determining that the first physical warehouse is in closer proximity to the geographic location than the second physical warehouse.

6. The method of claim 1, wherein determining that the first physical warehouse provides the lower overall delivery cost from the first virtual warehouse than the second physical warehouse comprises:
   determining that the second physical warehouse is associated with a first number of employees that is less than a first threshold number; and
   determining that the first physical warehouse is associated with a second number of employees that is equal to or greater than a second threshold number.

7. The method of claim 1, further comprising:
   wherein determining that the first physical warehouse provides the lower overall delivery cost from the first virtual warehouse than the second physical warehouse comprises determining that at least one of a first cost to package, a second cost to ship, or a third cost of labor is lower at the first physical warehouse than the second physical warehouse.

8. The method of claim 1, further comprising:
   providing the virtual-to-physical map as updated to the vendor.

9. A non-transitory, computer-readable medium including instructions stored thereon that when executed by one or more processors cause the one or more processors to perform operations comprising:
   receiving a virtual network configured by a vendor, the virtual network comprising a plurality of virtual warehouses;
   selecting a physical network based at least in part on the virtual network, the physical network comprising a plurality of physical warehouses;
   mapping the virtual network to the physical network to create a virtual-to-physical map;
   based at least in part on mapping the virtual network to the physical network to create the virtual-to-physical map, determining that a first physical warehouse of the plurality of physical warehouses provides a lower overall delivery cost, for delivering one or more physical items to a destination, from a first virtual warehouse to the destination than a second physical warehouse of the plurality of physical warehouses from the first virtual warehouse to the destination; and
   based at least in part on determining that the first physical warehouse of the plurality of physical warehouses provides the lower overall delivery cost from the first virtual warehouse to the destination than the second physical warehouse of the plurality of physical warehouses from the first virtual warehouse to the destination, updating the virtual-to-physical map to replace the second physical warehouse with the first physical warehouse.

10. The non-transitory, computer-readable medium of claim 9, wherein determining that the first physical warehouse provides the lower overall delivery cost from the first virtual warehouse than the second physical warehouse comprises:
    determining that the first physical warehouse is in closer proximity to the first virtual warehouse than the second physical warehouse.

11. The non-transitory, computer-readable medium of claim 9, wherein determining that the first physical warehouse provides the lower overall delivery cost from the first virtual warehouse than the second physical warehouse comprises:
    determining that the first physical warehouse is operating at a lower capacity than the second physical warehouse.

12. The non-transitory, computer-readable medium of claim 11, wherein determining that the first physical warehouse is operating at the lower capacity than the second physical warehouse comprises:

determining that the first physical warehouse is operating below 80% of total capacity; and determining that the second physical warehouse is operating above 90% of total capacity.

13. The non-transitory, computer-readable medium of claim 9, wherein the operations further comprise:

determining that a plurality of orders associated with the vendor are proximate a geographical location, wherein determining that the first physical warehouse provides the lower overall delivery cost from the first virtual warehouse than the second physical warehouse comprises determining that the first physical warehouse is in closer proximity to the geographic location than the second physical warehouse.

14. The non-transitory, computer-readable medium of claim 9, wherein determining that the first physical warehouse provides the lower overall delivery cost from the first virtual warehouse than the second physical warehouse comprises:

determining that the second physical warehouse is associated with a first number of employees that is less than a first threshold number; and determining that the first physical warehouse is associated with a second number of employees that is equal to or greater than a second threshold number.

15. The non-transitory, computer-readable medium of claim 9, wherein determining that the first physical warehouse provides the lower overall delivery cost from the first virtual warehouse than the second physical warehouse comprises determining that at least one of a first cost to package, a second cost to ship, or a third cost of labor is lower at the first physical warehouse than the second physical warehouse.

16. The non-transitory, computer-readable medium of claim 9, wherein the operations further comprise:

providing the virtual-to-physical map as updated to the vendor.

17. A system comprising:

one or more processors; and non-transitory, computer-readable media including instructions stored thereon that when executed by the one or more processors cause the one or more processors to perform operations comprising:

receiving a virtual network configured by a vendor, the virtual network comprising a plurality of virtual warehouses;

selecting a physical network based at least in part on the virtual network, the physical network comprising a plurality of physical warehouses;

mapping the virtual network to the physical network to create a virtual-to-physical map;

based at least in part on mapping the virtual network to the physical network to create the virtual-to-physical map, determining that a first physical warehouse of the plurality of physical warehouses provides a lower overall delivery cost, for delivering one or more physical items to a destination, from a first virtual warehouse to the destination than a second physical warehouse of the plurality of physical warehouses from the first virtual warehouse to the destination; and based at least in part on determining that the first physical warehouse of the plurality of physical warehouses provides the lower overall delivery cost from the first virtual warehouse to the destination than the second physical warehouse of the plurality of physical warehouses from the first virtual warehouse to the destination, updating the virtual-to-physical map to replace the second physical warehouse with the first physical warehouse.

18. The non-transitory, computer-readable medium of claim 17 wherein determining that the first physical warehouse provides the lower overall delivery cost from the first virtual warehouse than the second physical warehouse comprises:

determining that the first physical warehouse is in closer proximity to the first virtual warehouse than the second physical warehouse.

19. The non-transitory, computer-readable medium of claim 17, wherein determining that the first physical warehouse provides the lower overall delivery cost from the first virtual warehouse than the second physical warehouse comprises:

determining that the first physical warehouse is operating at a lower capacity than the second physical warehouse.

20. The non-transitory, computer-readable medium of claim 19, wherein determining that the first physical warehouse is operating at the lower capacity than the second physical warehouse comprises:

determining that the first physical warehouse is operating below 80% of total capacity; and determining that the second physical warehouse is operating above 90% of total capacity.

* * * * *